(12) United States Patent
Lee et al.

(10) Patent No.: US 9,989,806 B2
(45) Date of Patent: Jun. 5, 2018

(54) COLOR CONVERSION PANEL AND DISPLAY DEVICE INCLUDING THE SAME

(71) Applicant: SAMSUNG DISPLAY CO., LTD., Yongin-si, Gyeonggi-do (KR)

(72) Inventors: Kwang Keun Lee, Osan-si (KR); Dong-Uk Kim, Hwaseong-si (KR); Young Min Kim, Asan-si (KR); Hae II Park, Seoul (KR); Seung-Jin Baek, Suwon-si (KR); Kun Hee Jo, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 95 days.

(21) Appl. No.: 15/256,359

(22) Filed: Sep. 2, 2016

(65) Prior Publication Data
US 2017/0076678 A1 Mar. 16, 2017

(30) Foreign Application Priority Data

Sep. 10, 2015 (KR) .................. 10-2015-0128159
Aug. 19, 2016 (KR) .................. 10-2016-0105449

(51) Int. Cl.
*G02F 1/133* (2006.01)
*G09G 5/02* (2006.01)
(Continued)

(52) U.S. Cl.
CPC ...... *G02F 1/133617* (2013.01); *G02F 1/1336* (2013.01); *G02F 1/133512* (2013.01);
(Continued)

(58) Field of Classification Search
CPC combination set(s) only.
See application file for complete search history.

(56) References Cited

U.S. PATENT DOCUMENTS 7,750,984 B2 7/2010 Ha et al.
8,277,064 B2 10/2012 Willemsen et al.
(Continued)

FOREIGN PATENT DOCUMENTS

JP 2004-94039 A 3/2004
JP 2005-209662 A 8/2005
(Continued)

OTHER PUBLICATIONS

Heo, G.J. et al., Color PH-LCD Using STN Mode, IDW '98, Dec. 7, 1998, pp. 221-224, Samsung Display Devices Co., Ltd., Suwon, Korea.

(Continued)

*Primary Examiner* — Wesner Sajous
(74) *Attorney, Agent, or Firm* — Lewis Roca Rothgerber Christie LLP

(57) ABSTRACT

A color conversion panel includes: a substrate; a plurality of light emitting regions on the substrate; and a light blocking region between adjacent light emitting regions among the plurality of light emitting regions, wherein the light emitting regions respectively comprise: a color filter disposed on the substrate; and a color conversion layer comprising at least one of a phosphor or a quantum dot and a polymer layer overlapping with at least one of the color filter and the substrate, and the light blocking region comprises a partition comprising at least two overlapping color filters of different colors from each other.

20 Claims, 15 Drawing Sheets

(51) Int. Cl.
- *G09G 3/16* (2006.01)
- *G09G 3/32* (2016.01)
- *H04N 1/60* (2006.01)
- *G06K 9/32* (2006.01)
- *G09G 3/36* (2006.01)
- *G02F 1/1335* (2006.01)

(52) U.S. Cl.
CPC .......... *G02F 1/133514* (2013.01); *G02F 2001/133614* (2013.01); *G02F 2202/108* (2013.01)

(56) References Cited

U.S. PATENT DOCUMENTS

| | | | | |
|---|---|---|---|---|
| 8,294,848 | B2* | 10/2012 | Cho | G02F 1/133617 349/112 |
| 2010/0079704 | A1* | 4/2010 | Cho | G02F 1/133617 349/71 |
| 2012/0249937 | A1* | 10/2012 | Kim | G02F 1/133512 349/106 |
| 2017/0133550 | A1* | 5/2017 | Schuele | H01L 33/0079 |
| 2017/0146915 | A1* | 5/2017 | Levinski | G03F 7/70633 |

FOREIGN PATENT DOCUMENTS

| | | |
|---|---|---|
| KR | 10-2007-0029526 A | 3/2007 |
| KR | 10-0848078 B1 | 7/2008 |

OTHER PUBLICATIONS

Njo, S.L. et al., 23.3: Light-Efficient Liquid Crystal Displays Using Photoluminescent Color Filters, SID 00 Digest, 2000, pp. 343-345, Eindhoven University of Technology, Eindhoven, The Netherlands. (ISSN0000-0966X/00/3101-0343).

Oh, J.R. et al., Highly efficient full-color display based on blue LED backlight and electrochromic light-valve coupled with front emitting phosphors, Optics Express, Aug. 15, 2011, pp. 16022-16031, vol. 19, No. 17, Optical Society of America.

* cited by examiner

COLOR CONVERSION PANEL AND DISPLAY DEVICE INCLUDING THE SAME

CROSS-REFERENCE TO RELATED APPLICATION

This application claims priority to and the benefit of Korean Patent Application Nos. 10-2015-0128159 and 10-2016-0105449 filed in the Korean Intellectual Property Office on Sep. 10, 2015 and Aug. 19, 2016, respectively, the entire contents of which are incorporated herein by reference.

BACKGROUND

1. Field

Embodiments of the present invention relate to a color conversion panel and a display device including the same.

2. Description of the Related Art

Among display devices, a liquid crystal display device may have a structure in which field generating electrodes are provided in each of two display panels. Additionally, in a display device, a plurality of thin film transistors and pixel electrodes may be arranged in a matrix configuration in one display panel (hereinafter referred to as a 'thin film transistor array panel'), color filters of red, green, and blue may be arranged in the other display panel (hereinafter referred to as a 'common electrode panel'), and a common electrode may cover the entire surface thereof.

However, in liquid crystal display devices, light loss may occur in a polarizer and a color filter. In order to reduce light loss and implement high efficiency liquid crystal display devices, display devices may include a color conversion panel.

The above information disclosed in this Background section is only for enhancement of understanding of the background of the invention and therefore it may contain information that does not constitute prior art.

SUMMARY

Aspects of embodiments of the present invention include a color conversion panel reducing a reflection of external light and improving a contrast ratio and color reproducibility, and a display device including the same.

A color conversion panel according to an example embodiment of the present invention includes: a substrate; a plurality of light emitting regions on the substrate; and a light blocking region between adjacent light emitting regions among the plurality of light emitting regions, wherein the light emitting regions respectively comprise: a color filter disposed on the substrate; and a color conversion layer comprising at least one of a phosphor or a quantum dot and a polymer layer overlapping with at least one of the color filter and the substrate, and the light blocking region comprises a partition comprising at least two overlapping color filters of different colors from each other.

According to some embodiments, a color filter in the light emitting region and a color filter in the light blocking region are connected to each other.

According to some embodiments, the color filter in the light blocking region and the color filter in the light emitting region that are connected to each other cover one side surface of the color filters having the different colors.

According to some embodiments, the color filter in the light emitting region and the color filter in the light blocking region have a step.

According to some embodiments, the color conversion layer comprises a red color conversion layer and a green color conversion layer, and at least one among the red color conversion layer, the green color conversion layer, or the polymer layer comprises a scatterer.

According to some embodiments, the color filter comprises a red color filter, a green color filter, and a blue color filter, and in the light emitting region, the red color filter and the red color conversion layer overlap, the green color filter and the green color conversion layer overlap, and the blue color filter and the polymer layer overlap.

According to some embodiments, the red color filter, the green color filter, and the blue color filter overlap in the light blocking region, and the blue color filter in the light blocking region is closer to the substrate than the red color filter and the green color filter.

According to some embodiments, the color filter comprises a red color filter and a green color filter, in the light emitting region, the red color filter and the red color conversion layer overlap, and the green color filter and the green color conversion layer overlap, and the red color filter, the green color filter, and the polymer layer overlap in the light blocking region.

According to some embodiments, the polymer layer comprises at least one of a dye or a pigment.

According to some example embodiments of the present invention, a display device includes: a display panel; and a color conversion panel on the display panel, wherein the color conversion panel comprises: a substrate; a plurality of light emitting regions on one surface of the substrate toward the display panel; and a light blocking region between adjacent light emitting regions among the plurality of light emitting regions, the light emitting regions respectively comprising: a color filter on the one surface of the substrate toward the display panel; and a color conversion layer comprising at least one of a phosphor or a quantum dot and a polymer layer between the substrate and the display panel, and the light blocking region comprises a partition made by overlapping at least two color filters having different colors from each other.

According to some embodiments, the color filter in the light emitting region and the color filter disposed in the light blocking region are connected to each other.

According to some embodiments, the color filter in the light emitting region and the color filter in the light blocking region that are connected to each other cover one side surface of the color filters having the different colors.

According to some embodiments, the color filter in the light emitting region and the color filter in the light blocking region have a step.

According to some embodiments, the color conversion layer comprises a red color conversion layer and a green color conversion layer, and at least one of the red color conversion layer, the green color conversion layer, or the polymer layer comprises a scatterer.

According to some embodiments, the color filter comprises a red color filter, a green color filter, and a blue color filter, and in the light emitting region, the red color filter and the red color conversion layer overlap, the green color filter and the green color conversion layer overlap, and the blue color filter and the polymer layer overlap.

According to some embodiments, the red color filter, the green color filter, and the blue color filter overlap in the light blocking region, and the blue color filter in the light blocking region is closer to the substrate than the red color filter and the green color filter.

According to some embodiments, the color filter comprises a red color filter and a green color filter, and in the light emitting region, the red color filter and the red color conversion layer overlap, and the green color filter and the green color conversion layer overlap, and the red color filter, the green color filter, and the polymer layer overlap in the light blocking region.

According to some embodiments, the polymer layer comprises at least one of a dye or a pigment.

According to some embodiments, the display panel comprises: a first insulation substrate; a thin film transistor on the first insulation substrate; a pixel electrode connected to the thin film transistor; a common electrode configured to form an electric field with the pixel electrode; a second insulation substrate overlapping the first insulation substrate to be separated therefrom; and a liquid crystal layer between the first insulation substrate and the second insulation substrate.

According to some embodiments, the display panel comprises: an insulation substrate; a thin film transistor on the insulation substrate; a pixel electrode connected to the thin film transistor; a roof layer overlapping the pixel electrode; and a liquid crystal layer in a plurality of microcavities between the pixel electrode and the roof layer.

The color conversion panel and the display device according to an example embodiment of the present invention have a relatively excellent contrast ratio and color reproducibility, such that the display quality may be improved.

DETAILED DESCRIPTION

Figure 1:
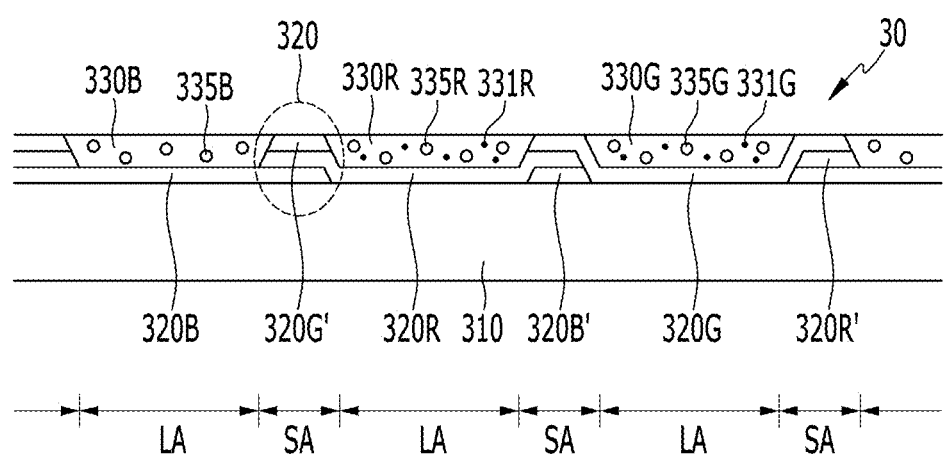
FIG. 1 is a cross-sectional view of a color conversion panel according to an example embodiment of the present invention.

Aspects of example embodiments of the present invention will be described more fully hereinafter with reference to the accompanying drawings, in which example embodiments of the invention are shown. As those skilled in the art would realize, the described embodiments may be modified in various different ways, all without departing from the spirit or scope of the present invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Next, a color conversion panel according to an example embodiment of the present invention will be described with reference to FIG. 1. FIG. 1 is a cross-sectional view of a color conversion panel according to an example embodiment of the present invention.

As shown in FIG. 1, a color conversion panel 30 according to an example embodiment of the present invention includes a light emitting region LA and a light blocking region SA. The light emitting region LA includes a plurality of regions emitting different lights from each other, and the light blocking region SA is arranged between the plurality of light emitting regions LA, thereby preventing mixture of the color of the lights emitted from the different color conversion layers and polymer layers.

A plurality of color filters 320R, 320R', 320G, 320G', 320B, and 320B' are arranged or formed on a substrate 310. The color filters 320R, 320R', 320G, 320G', 320B, and 320B' may be made of a photosensitive resin material and may respectively include a dye representing a unique color.

The color filters 320R, 320R', 320G, 320G', 320B, and 320B' may uniquely display one of primary colors, and examples of the primary colors are three primary colors of red, green and blue, or yellow, cyan, and magenta. As one example, the present specification describes the color filters 320R, 320R', 320G, 320G', 320B, and 320B' respectively displaying red, green, and blue.

The color filters 320R, 320R', 320G, 320G', 320B, and 320B' according to an example embodiment include red color filters 320R and 320R', green color filters 320G and 320G', and blue color filters 320B and 320B'. The red color filters 320R and 320R', the green color filters 320G and 320G', and the blue color filters 320B and 320B' may be respectively arranged in the light emitting region LA or the light blocking region SA.

For example, a portion of the red color filters 320R and 320R' may be arranged to be disposed on the substrate 310 in the light emitting region LA, as shown in FIG. 1, or may be arranged to overlay different color filters 320G' and 320B' in the light blocking region SA. A portion of the green color filters 320G and 320G' is arranged to be disposed on the substrate 310 in the light emitting region LA and is arranged to overlap the different color filters 320R' and 320B' in the light blocking region SA. Also, a portion of the blue color filter 320B is arranged to be disposed on the substrate 310 in the light emitting region LA and is arranged to overlap the different color filters 320R' and 320G' in the light blocking region SA.

That is, in the light blocking region SA, at least two color filters 320R', 320G', and 320B' overlap each other, and one of the color filters 320R, 320G, and 320B representing the color (e.g., the predetermined color) is arranged in the light emitting region LA. According to some example embodiments of the present invention, if the plurality of color filters 320R', 320G,' and 320B' overlap each other, blocking of the light emitted in the display panel or a light assembly or prevention of color mixing may be possible without a separate light blocking member.

The light blocking region SA includes a partition 320 formed by overlapping the plurality of color filters 320R', 320G', and 320B'. A color conversion layer that will be described in more detail below is formed between the partitions 320 formed as described above.

Because the plurality of color filters 320R', 320G', and 320B' are overlapped to form the partition 320, the color filters 320R', 320G', and 320B' arranged in the light blocking region SA and the color filters 320R, 320G, and 320B arranged in the light emitting region LA may have a step (e.g., a stepped structure or cross-sectional shape). The plurality of color filters 320R', 320G', and 320B' overlap each other in the light blocking region SA to be formed higher than the color filters 320R, 320G, and 320B arranged in the light emitting region LA from the substrate 310.

The color filters 320R, 320G, and 320B arranged in the light emitting region LA and the color filters 320R', 320G', and 320B' arranged in the light blocking region SA may be connected.

Referring to FIG. 1, the blue color filters 320B arranged in the light emitting region LA and the blue color filters 320B' arranged in the light blocking region SA adjacent to the light emitting region LA may be connected. Likewise, the red color filters 320R arranged in the light emitting region LA and the red color filters 320R' arranged in the light blocking region SA adjacent to the light emitting region LA may be connected. Also, the green color filters 320G arranged in the light emitting region LA and the green color filters 320G' arranged in the light blocking region SA adjacent to the light emitting region LA may be connected. This is because the color filters having the same color may be formed of the same material and may be formed through the same manufacturing process.

The red color filters 320R' are arranged on the blue color filters 320B' arranged in the light blocking region SA, and the red color filters 320R' may be arranged throughout the light emitting region LA and the adjacent light blocking region SA. Accordingly, the red color filters 320R' overlap the blue color filters 320B' to form the partition 320, and may concurrently (e.g., simultaneously) cover one side surface of the blue color filters 320B'.

Likewise, the green color filters 320G' are arranged on the red color filters 320R' arranged in the light blocking region SA, and the green color filters 320G' may be arranged throughout the light emitting region LA and the adjacent light blocking region SA. Accordingly, the green color filters 320G' overlap the red color filters 320R' to form the partition 320, and may concurrently (e.g., simultaneously) cover one side surface of the red color filters 320R'.

The present specification describes the shape in which the red, green, and the blue color filters covers one side surface, but the sequence of the red, green, and blue is not limited.

Each of the color filters 320R, 320G, and 320B arranged in the light emitting region LA includes a dye representing the predetermined color, and the dye absorbs external light incident to the color filter from the outside, thereby reducing a reflection degree of the external light. According to an example embodiment, the red color filters 320R may include a red dye, the green color filters 320G may include a green dye, and the blue color filters 320B may include a blue dye.

Also, the red color filters 320R', the green color filters 320G', and the blue color filters 320B' arranged in the light blocking region SA may be deposited regardless of the sequence. The order of red, green, and blue may be stacked or the order of blue, green, and red may be stacked, and it is not limited thereto and the order of any combination is possible.

However, the blue color filters 320B' may be firstly stacked on the substrate 310, as one example. The external light incident outside the substrate 310 is partially absorbed by the blue color filters 320B', thereby reducing the reflectance of the display device, and the light reflected by the blue color filters 320B' is not recognized by a user.

A plurality of color conversion layers 330R and 330G and polymer layers 330B are arranged on the plurality of color filters 320R, 320G, and 320B arranged in the light emitting region LA. The plurality of color conversion layers 330R and 330G and polymer layers 330B may emit light of different colors from each other, and as one example, may be a red color conversion layer 330R, a green color conversion layer 330G, and a polymer layer 330B.

The overlapped color filters 320R', 320G', and 320B' are arranged in the light blocking region SA between the adjacent color conversion layers 330R and 330G and polymer layers 330B. That is, the light blocking region SA is between the adjacent color conversion layers 330R and 330G and polymer layers 330B and may define the region where the red color conversion layer 330R, the green color conversion layer 330G, and the polymer layer 330B are arranged.

The red color conversion layer 330R includes at least one of a phosphor or a quantum dot 331R converting the incident blue light into the red light.

When the red color conversion layer 330R incudes the red phosphor, the red phosphor may one material among (Ca, Sr, BA)S, (Ca, Sr, BA$_2$)Si$_5$N$_8$, CASN (CaAlSiN$_3$), CaMoO$_4$, and Eu$_2$Si$_5$N$_8$. The red color conversion layer 330R may include the red phosphor of at least one kind.

The green color conversion layer 330G may include at least one of the phosphor or the quantum dot 331G converting the incident blue light into the green light, and in the present specification, the example embodiment including the quantum dot 331G is described.

When the green color conversion layer 330G includes the green phosphor, the green phosphor may be at least one material among yttrium aluminum garnet (YAG), (Ca, Sr, BA)$_2$SiO$_4$, SrGa$_2$S$_4$, barium magnesium aluminate (BAM), α-SiAlON, β-SiAlON, Ca$_3$Sc$_2$Si$_3$O$_{12}$, Tb$_3$Al$_5$O$_{12}$, BaSiO$_4$, CaAlSiON, or (Sr$_{1-x}$Ba$_x$)Si$_2$O$_2$N$_2$, but embodiments of the present invention are not limited thereto. The green color conversion layer 330G may include at least one kind green phosphor. In this case, x may be a number between 0 and 1.

The red color conversion layer 330R and the green color conversion layer 330G include the quantum dots 331R and 331G instead of the phosphor converting the color, or further include the quantum dots 331R and 331G in additional to the phosphor. In this case, the quantum dot may be selected from a Group II-VI compound, a Group III-V compound, a Group IV-VI compound, a Group IV element, a Group IV compound, and a combination thereof.

The Group II-VI compound may be selected from the group consisting of a binary compound selected from the group consisting of CdSe, CdTe, ZnS, ZnSe, ZnTe, ZnO, HgS, HgSe, HgTe, MgSe, MgS, and a mixture thereof; a tertiary compound selected from the group consisting of CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS, and a mixture thereof; and a quaternary compound selected from the group consisting of HgZnTeS, CdZnSeS, CdZnSeTe, CdZnSTe, CdHgSeS, CdHgSeTe, CdHgSTe, HgZnSeS, HgZnSeTe, HgZnSTe, and a mixture thereof. The Group III-V compound may be selected from the group consisting of a binary compound selected from the group consisting of GaN, GaP, GaAs, GaSb, AlN, AlP, AlAs, AlSb, InN, InP, InAs, InSb, and a mixture thereof; a tertiary compound selected from the group consisting of GaNP, GaNAs, GaNSb, GaPAs, GaPSb, AlNP, AlNAs, AlNSb, AlPAs, AlPSb, InNP, InNAs, InNSb, InPAs, InPSb, GaAlNP, and a mixture thereof; and a quaternary compound selected from the group consisting of GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb, and a mixture thereof. The Group IV-VI compound may be selected from the group consisting of a binary compound selected from the group consisting of SnS, SnSe, SnTe, PbS, PbSe, PbTe, and a mixture thereof; a tertiary compound selected from the group consisting of SnSeS, SnSeTe, SnSTe, PbSeS, PbSeTe, PbSTe, SnPbS, SnPbSe, SnPbTe, and a mixture thereof; and a quaternary compound selected from the group consisting of SnPbSSe, SnPbSeTe, SnPbSTe, and a mixture thereof. The Group IV element may be selected from the group consisting of Si, Ge, and a mixture thereof. The Group IV compound may be a binary compound selected from the group consisting of SiC, SiGe, and a mixture thereof.

In this case, the binary compound, the tertiary compound, or the quaternary compound may exist in particles at a uniform concentration, or may exist in the same particle divided into states where concentration distributions are partially different. Further, the color conversion media layer may have a core/shell structure where one quantum dot surrounds another quantum dot. An interface between the core and the shell may have a concentration gradient, such that a concentration of an element existing in the shell is gradually reduced nearing the center thereof.

According to some embodiments of the present invention, the quantum dots 331R and 331G may have a full width at half maximum (FWHM) of an emission wavelength spectrum of about 45 nm or less. According to some embodiments of the present invention, the quantum dots 331R and 331G may have a FWHM of an emission wavelength spectrum of about 40 nm or less. According to some embodiments of the present invention, the quantum dots 331R and 331G may have a FWHM of an emission wavelength spectrum of about 30 nm or less. Accordingly, color purity or color reproducibility may be improved. Also, the light emitted through the quantum dot is irradiated in all directions, thereby improving a light viewing angle.

Further, a form or arrangement of the quantum dot is a form or arrangement generally used in the art and is not particularly limited, but may include arrangements or configurations such as spherical, pyramidal, multi-arm-shaped, or cubic nanoparticles, nanotubes, nanowires, nanofibers, and nanoplate-shaped particles.

The polymer layer 330B may be resin material transmitting the supplied blue light. That is, the polymer layer 330B corresponding to the region emitting the blue emits the incident blue light without the separate phosphor or quantum dots.

The material of the red color conversion layer 330R, the green color conversion layer 330G, and the polymer layer 330B may be a photosensitive resin as one example, and accordingly, may be formed through the photolithography process. Also, the red color conversion layer, the green color conversion layer, and the polymer layer may be formed through a printing process, and in the case of the manufacturing process, another material that is not the photosensitive resin and is appropriate for the printing process may be used.

In the present specification, the color conversion layer is formed by the photolithography process or the printing process, however it is not limited thereto, and any method and any material may be applied.

At least one of the plurality of color conversion layers 330R and 330G and polymer layers 330B may further include a scatterer 335R, 335G, and 335B. For example, the plurality of color conversion layers 330R and 330G and polymer layers 330B may include the scatterers 335R, 335G, and 335B, however it is not limited thereto, and an example embodiment in which the polymer layer 330B includes the scatterer 335B, and the red color conversion layer 330R and the green color conversion layer 330G do not include the scatterer 335R and 335G is possible. Hereafter, an example embodiment in which a plurality of color conversion layers 330R and 330G and polymer layers 330B respectively include the scatterers 335R, 335G, and 335B will be described.

As shown in FIG. 1, the red color conversion layer 330R, the green color conversion layer 330G, and the polymer layer 330B according to an example embodiment of the present invention include the scatterers 335R, 335G, and 335B, respectively. Each of the scatterers 335R, 335G, and 335B scatters the light emitted from at least one of the phosphor and the quantum dot so as to emit a lot of light. That is, the light emitting efficiency is increased.

In this case, the content of the scatterers 335R and 335G included in the red color conversion layer 330R and the green color conversion layer 330G may be different from the content of the scatterer 335B included in the polymer layer 330B. As one example, the content of the scatterer 335B included in the polymer layer 330B may be larger than the content of the content of the scatterer 335R and 335G included in the red color conversion layer 330R and the green color conversion layer 330G.

The scatterer 335B included in the polymer layer 330B may allow front luminance and lateral luminance of the light emitted from the polymer layer 330B to be uniform. Also, the scatterers 335R and 335G included in the red color conversion layer 330R and the green color conversion layer 330G may increase the efficiency of the light amount emitted from the red color conversion layer 330R and the green color conversion layer 330G. As described above, the scatterers 335R, 335G, and 335B included in each color conversion layer and polymer layer may have different objects, thereby being included in different contents.

The material of the scatterers 335R, 335G, and 335B may be any material of the metal or the metal oxide to evenly scatter light, and as one example, one among $TiO_2$, $ZrO_2$, $Al_2O_3$, $In2O3$, $ZnO$, $SnO_2$, $Sb_2O_3$, and ITO may be used.

Also, the scatterers 335R, 335G, and 335B may have a refractive index of about 1.5 or more. The color conversion layers 330R and 330G and the polymer layers 330B including the scatterers 335R, 335G, and 335B having this refractive index may improve the light emitting efficiency.

The above-described color conversion panel may reduce the reflection phenomenon for the light incident from the outside of the panel while providing relatively excellent color reproducibility and light efficiency, thereby providing the improved contrast ratio. Also, by overlapping the plurality of color filters instead of including the light blocking member, the manufacturing process may be simplified and the time and the cost may be reduced.

Figure 2:
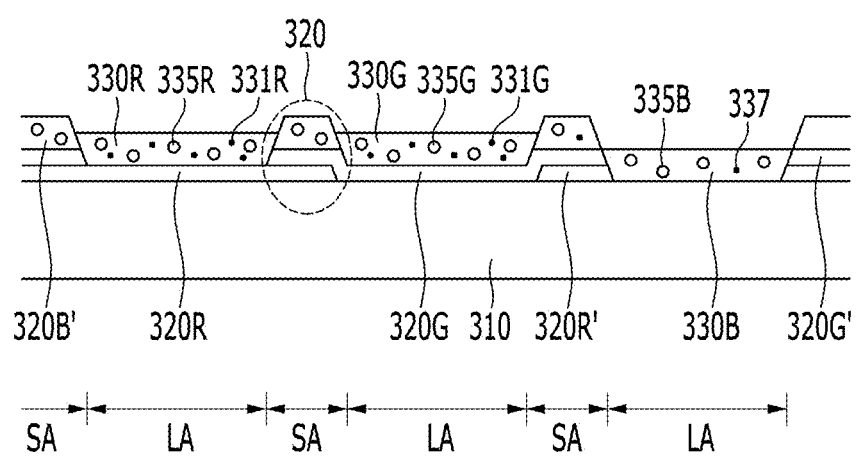
FIG. 2 is a cross-sectional view of a color conversion panel according to an example embodiment of the present invention.

Next, the color conversion panel according to an example embodiment of the present invention will be described with reference to FIG. 2. FIG. 2 is a cross-sectional view of a color conversion panel according to an example embodiment of the present invention. The description of the same or similar constituent elements to the example embodiment described in FIG. 1 may be omitted.

The color conversion panel 30 shown in FIG. 2 includes the light emitting region LA and the light blocking region SA. The light emitting region LA includes the plurality of regions emitting the different lights, and the light blocking region SA is arranged between the plurality of light emitting regions and may prevent the light from emitting in the direction toward the user.

A plurality of color filters 320R, 320R', 320G, and 320G' are arranged on the substrate 310. The color filters 320R, 320R', 320G, and 320G are formed of the photosensitive resin and may include the dye respectively representing the colors.

The color filters 320R and 320G may uniquely represent one of the primary colors, and as one example, the color filters respectively representing red and green may be used. That is, the color filters 320R, 320R', 320G, and 320G' include the red color filters 320R and 320R' and the green color filters 320G and 320G'. The red color filters 320R and 320R' and the green color filters 320G and 320G' may be respectively arranged in the light emitting region LA or the light blocking region SA.

In detail, the red color filters 320R and 320R' may be arranged in the light emitting region LA to be disposed on the substrate 310, and may be arranged to overlap the green color filters 320G' and the polymer layer 330B that is described later in the light blocking region SA. The green color filters 320G are also arranged to be disposed on the substrate 310 in the light emitting region LA, and are arranged to overlap the red color filters 320R' and the polymer layer 330B in the light blocking region SA.

That is, at least two color filters 320R' and 320G' and the polymer layer 330B overlap in the light blocking region SA, and one of the color filters 320R and 320G representing the color (e.g., the predetermined color) is arranged to be disposed on the substrate 310 in the light emitting region LA. In the light blocking region SA, the plurality of color filters and the polymer layer are arranged such that the light emitted in the display panel or the light assembly may be blocked or prevented without the separate light blocking member.

Each of the color filters 320R, 320R', 320G, and 320G' includes the dye representing the color (e.g., the predetermined color), and the dyes 320R, 320R', 320G and 320G' absorb the external light incident to the color filter from the outside, thereby reducing the reflection degree due to the external light. Also, by forming the light blocking region by the overlapping of the color filter without the separate light blocking member, the process time and the cost due to the manufacturing may be reduced.

The plurality of color conversion layers 330R and 330G and polymer layers 330B are arranged on the plurality of color filters 320R and 320G and polymer layers 320B or the substrate 310 arranged in the light emitting region LA. The plurality of color conversion layers 330R and 330G and polymer layers 330B may emit the light of the different colors, and as one example, they may be the red color conversion layer 330R, the green color conversion layer 330G, and the polymer layer 330B.

The overlapped color filters 320R' and 320G' and polymer layer 330B arranged in the light blocking region SA are arranged between the adjacent color conversion layers 330R and 330G and polymer layers 330B. That is, the light blocking region SA is arranged between the adjacent color conversion layers 330R and 330G and polymer layers 330B, and may define the region where the red color conversion layer 330R, the green color conversion layer 330G, and the polymer layer 330B are arranged.

The red color conversion layer 330R includes at least one among the phosphor and quantum dot 331R converting the incident blue light into the red light. The green color conversion layer 330G includes at least one of the phosphor and the quantum dot 331G converting the incident blue light into the green light, and the present specification describes an example embodiment including the quantum dot 331G as one example.

The red color conversion layer 330R and the green color conversion layer 330G may include the quantum dots 331R and 331G converting the color instead of the phosphor, or may include the quantum dots 331R and 331G in additional to the phosphor. In this case, the quantum dot may be selected from the Group II-VI compound, the Group IV-VI compound, the Group IV element, the Group IV compound, and the combinations thereof.

The polymer layer 330B may be the resin material passing the blue light supplied from the light assembly. That is, the polymer layer 330B corresponding to the region emitting the blue light emits the incident blue light as it is without the separate phosphor or quantum dot.

The polymer layer 330B according to an example embodiment is arranged to be disposed on the substrate 310 in the light emitting region LA and overlaps the plurality of color filters 320R' and 320G' in the light blocking region SA. Differently from the example embodiment described in FIG. 1, the example embodiment of FIG. 2 does not include the blue color filter. Accordingly, the polymer layer 330B' according to an example embodiment is arranged in the light blocking region SA as well as the red color filters 320R' and the green color filters 320G'.

The polymer layer 330B may further include an additive, and the additive may include at least one of the pigment and the dye 337. At least one among the pigment and the dye 337 according to an example embodiment of the present invention may absorb the red light and the green light incident from the outside, and may reflect the blue light.

As the pigment and the dye 337 absorb the red light and the green light and reflect the blue light, the reflectance increasing phenomenon appearing in the polymer layer 330B by the reflection of the light incident from the outside may be prevented or reduced. When a significant degree of the reflection is generated in the polymer layer 330B by the reflection of the light incident from the outside, the entire contrast ratio of the display device may be reduced and the color reproducibility is reduced, thereby generating display deterioration.

The pigment and the dye 337 may include any material to absorb the red light and the green light, and as one example according to the present invention, a blue pigment or a blue dye may be utilized. The blue pigment and the blue dye absorb the red light and the green light and emit or reflect the blue light.

According to an example embodiment of the present invention, because the pigment and the dye 337 absorb the red light and the green light, the red color conversion layer 330R and the green color conversion layer 330G may not include the pigment and the dye 337.

The material of the red color conversion layer, the green color conversion layer, and the polymer layer may be the photosensitive resin as one example, and accordingly, they may be formed through the photolithography process. Alternatively, the red color conversion layer, the green color conversion layer, and the polymer layer may be formed through the printing process, and in the case by the manufacturing process, another material that is not the photosensitive resin and is appropriate to the printing process may be utilized. In the present specification, the color conversion layer and the polymer layer are formed by the photolithography process or the printing process, however embodiments of the present invention are not limited thereto, and any method and any material may be applied.

At least one of the plurality of color conversion layers 330R and 330G and polymer layers 330B according to an example embodiment of the present invention may further include the scatterers 335R, 335G, and 335B. For example, the plurality of color conversion layers 330R and 330G and polymer layers 330B may respectively include the scatterers 335R, 335G, and 335B, however embodiments of the present invention are not limited thereto, and the polymer layer 330B may include the scatterer 335B and the red color conversion layer 330R and the green color conversion layer 330G may include the scatterers 335R and 335G. Hereafter, an example embodiment in which the plurality of color conversion layers 330R and 330G and polymer layers 330B respectively include the scatterers 335R, 335G, and 335B is described.

As shown in FIG. 2, according to an example embodiment of the present invention, the red color conversion layer 330R, the green color conversion layer 330G, and the polymer layer 330B include the scatterers 335R, 335G, and 335B, respectively. Each of the scatterers 335R, 335G, and 335B scatters the light emitted from at least one of the phosphor and the quantum dot, thereby emitting more light. That is, the light emitting efficiency may be increased.

The material of the scatterers 335R, 335G, and 335B may be any material of the metal or the metal oxide to scatter the incident light to be uniform, and as one example, one among $TiO_2$, $ZrO_2$, $Al_2O_3$, $In2O3$, $ZnO$, $SnO_2$, $Sb_2O_3$, and ITO may be used.

Also, the scatterers 335R, 335G, and 335B may have the refractive index of about 1.5 or more. The color conversion layers 330R and 330G and the polymer layers 330B including the scatterers 335R, 335G, and 335B having the refractive index may improve the light emitting efficiency.

The example embodiment shown in FIG. 2 does not separately include the blue color filter, and the polymer layer including at least one of the dye and the pigment may replace the blue color filter. Accordingly, the manufacturing process may be simplified and the manufacturing cost and time may be reduced.

Next, a manufacturing method of the color conversion panel according to an example embodiment of the present invention will be described with reference to FIG. 3 to FIG. 7. FIG. 3, FIG. 4, FIG. 5, FIG. 6, and FIG. 7 are cross-sectional views of a color conversion panel according to an example embodiment of a manufacturing process.

Figure 3:
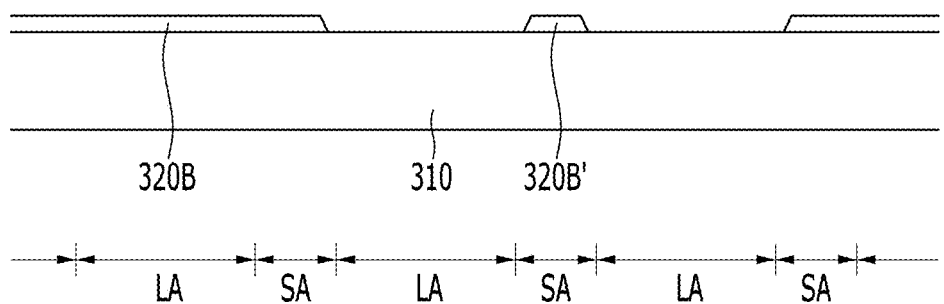
FIG. 3, FIG. 4, FIG. 5, FIG. 6, and FIG. 7 are cross-sectional views of a color conversion panel, and illustrating various aspects of a manufacturing process, according to an example embodiment of the present invention.

Firstly, as shown in FIG. 3, a blue color filter resin is coated on the substrate 310, and exposed and developed to form the blue color filters 320B and 320B' arranged in the light emitting region LA and the light blocking region SA.

Figure 4:
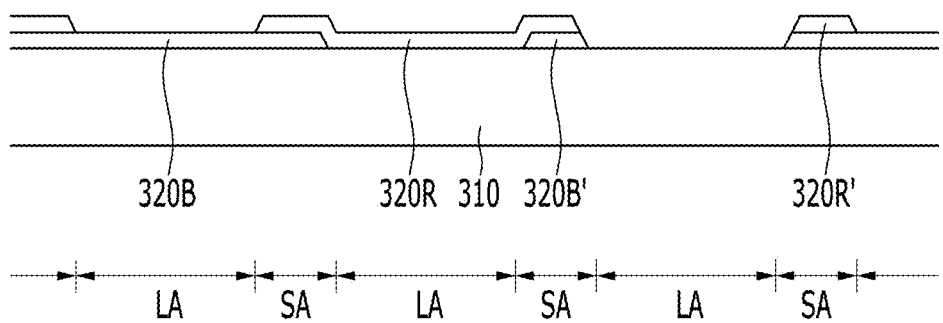

Next, as shown in FIG. 4, a red color filter resin is coated on the substrate 310 and the blue color filters 320B and 320B', and exposed and developed to form the red color filters 320R and 320R' respectively arranged in the light emitting region LA and the light blocking region SA. In this case, the portion of the red color filter 320R' arranged in the light blocking region SA overlaps the blue color filters 320B' arranged in the light blocking region SA.

Figure 5:
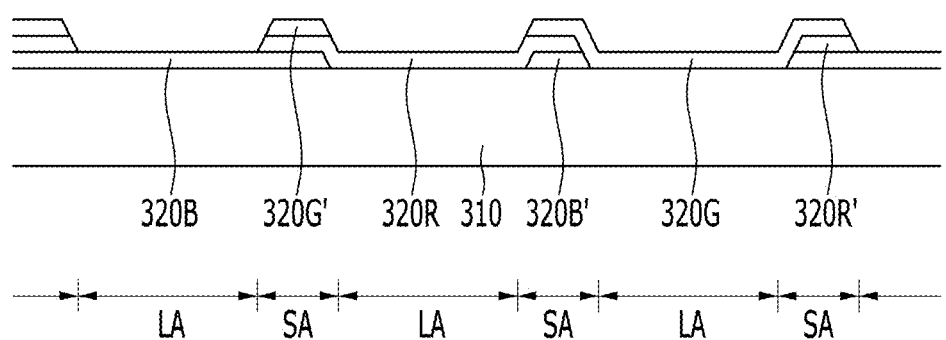

Referring to FIG. 5, a green color filter resin is coated on the substrate 310, the blue color filters 320B and 320B', and the red color filters 320R and 320R', and exposed and developed to form the green color filters 320G and 320G' arranged in the light emitting region LA and the light blocking region SA.

In this case, the blue color filter 320B, the red color filter 320R, and the green color filter 320G are arranged to be disposed on the substrate 310 in the light emitting region LA, and the blue color filter 320B', the red color filter 320R', and the green color filter 320G' are arranged to overlap each other in the light blocking region SA.

After positioning the color filters, the partition formed by the overlapping color filters is formed in the light blocking region SA, and the step is formed between the light blocking region SA and the light emitting region LA.

Figure 6:
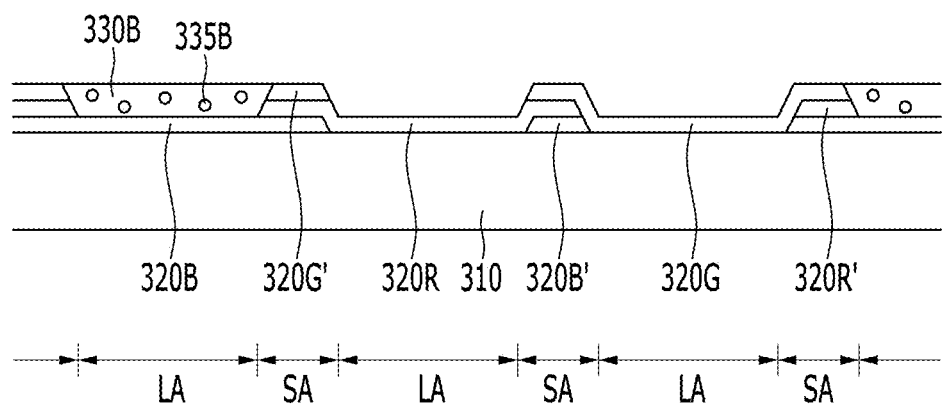

Next, as shown in FIG. 6, a first color conversion resin is coated on the plurality of color filters 320R, 320R', 320G, 320G', 320B, and 320B', and exposed and developed to form the polymer layer 330B. The first color conversion resin for the polymer layer 330B does not include the phosphor and the quantum dot, but includes the scatterer. Also, when forming the color conversion panel according to FIG. 2, the first color conversion resin may include at least one of the dye and the pigment.

Figure 7:
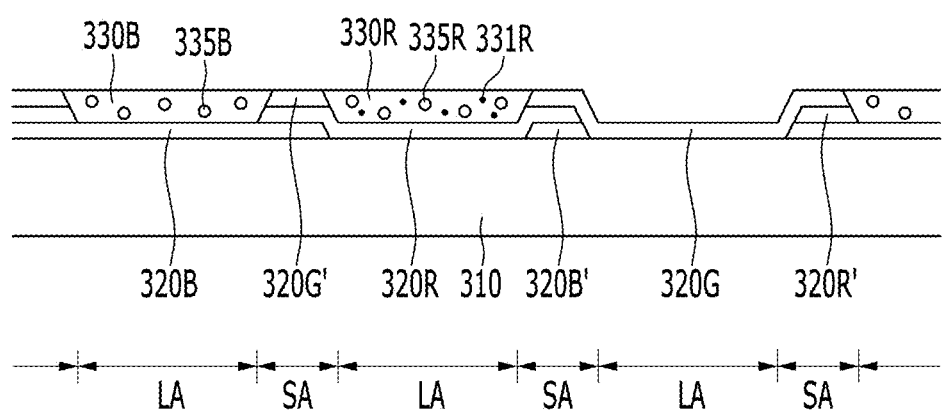

As shown in FIG. 7, a second color conversion resin is coated on the plurality of color filters 320R, 320R', 320G, 320G', 320B, and 320B', and the polymer layer 330B, and exposed and developed to form the red color conversion layer 330R. The second color conversion resin for the red color conversion layer 330R includes at least one of the phosphor and the quantum dot.

Next, a third color conversion resin is coated on the plurality of color filters 320R, 320R', 320G, 320G', 320B, and 320B', the polymer layer 330B, and the red color conversion layer 330R, and exposed and developed to form the green color conversion layer 330G. The thusly manufactured color conversion panel is the same as or substantially similar to the arrangement shown in FIG. 1. The third color conversion resin for the green color conversion layer 330G includes at least one of the phosphor and the quantum dot.

Referring to FIG. 3 to FIG. 7, in the described manufacturing method of the color conversion panel, the order of the color filters and the color conversion layer is the order of blue, red, and green, however it is not limited thereto, and any constituent element among blue, red, and green may be firstly formed.

The color conversion panel shown in FIG. 2 may also be manufactured by using the above-described manufacturing method. In the color conversion panel shown in FIG. 2, the blue color filter may be omitted and the polymer layer may replace the function and the position of the blue color filter.

Figure 8:
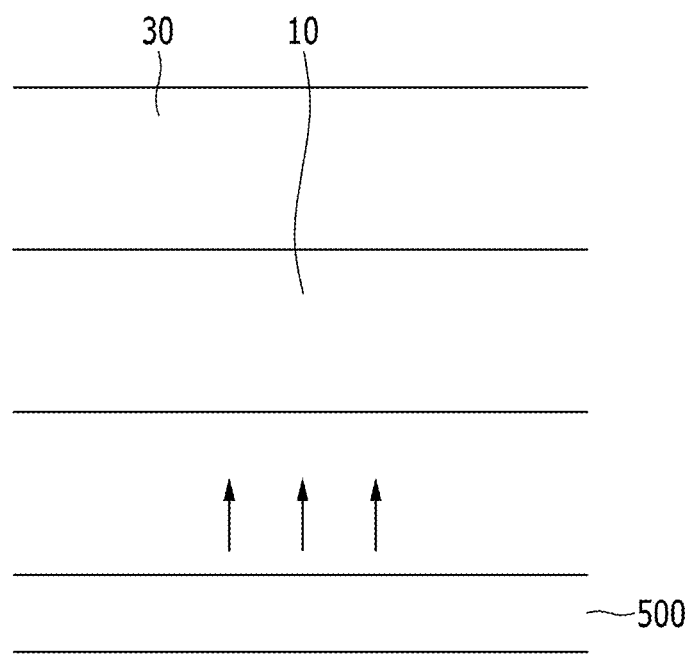
FIG. 8 is a schematic cross-sectional view of a display device according to an example embodiment of the present invention.
Figure 9:
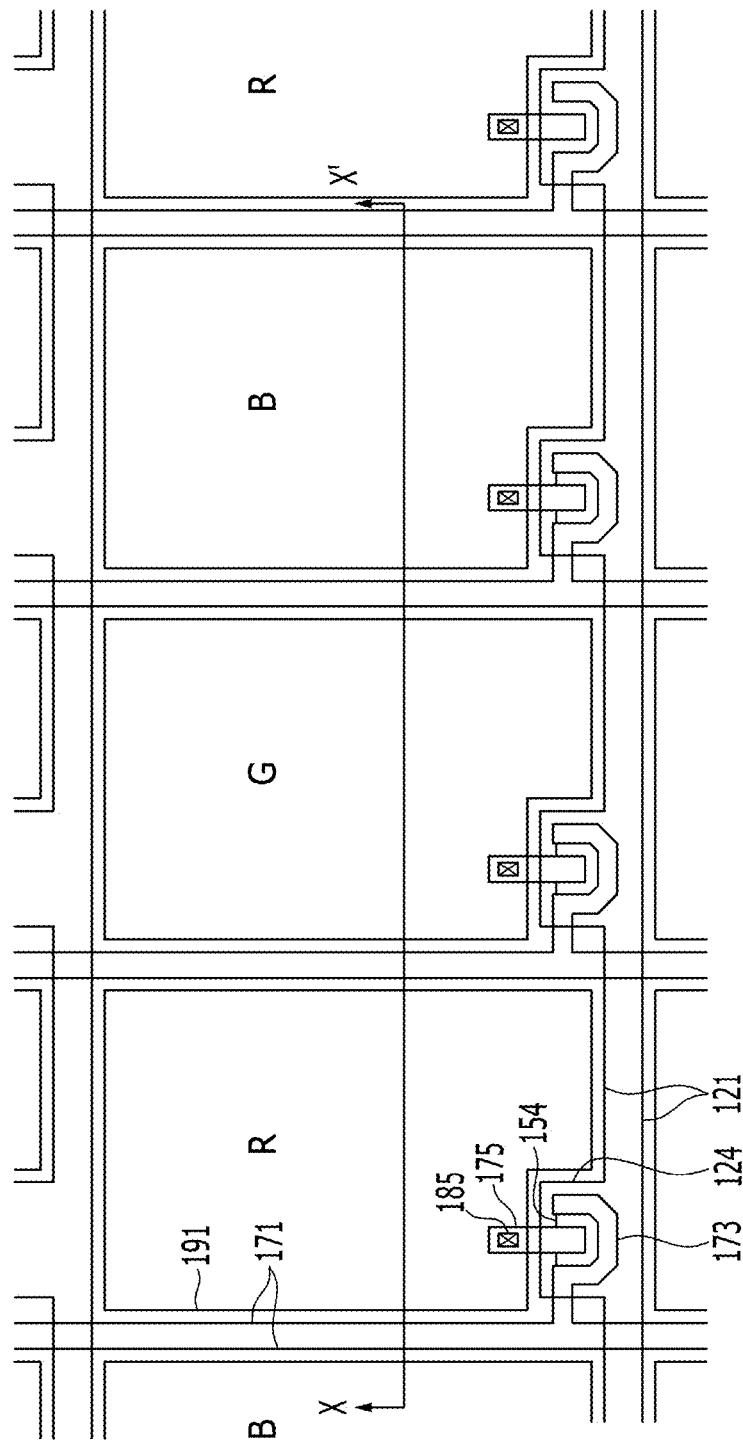
FIG. 9 is a top plan view of a display device according to an example embodiment of the present invention.
Figure 10:
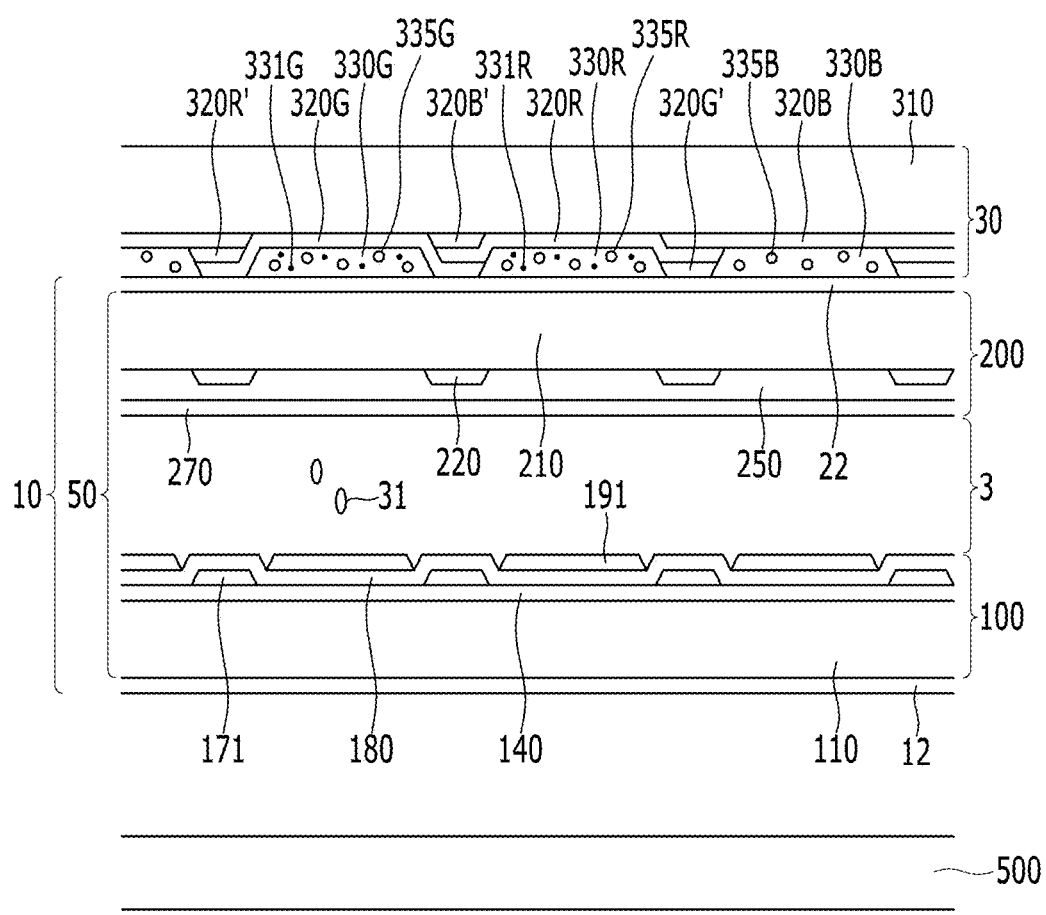
FIG. 10 is a cross-sectional view taken along the line X-X' of FIG. 9.

Next, a display device according to an example embodiment of the present invention will be described with reference to FIG. 8 to FIG. 10. FIG. 8 is a schematic cross-sectional view of a display device according to an example embodiment of the present invention, FIG. 9 is a top plan view of a display device according to an example embodiment of the present invention, and FIG. 10 is a cross-sectional view taken along the line X-X' of FIG. 9.

Firstly, when the display device according to an example embodiment of the present invention is described with reference to FIG. 8, the display device includes a color conversion panel 30, a display panel 10 that overlaps the color conversion panel 30, and a light assembly 500. The color conversion panel 30 according to an example embodiment of the present invention may be the color conversion panel described with reference to FIG. 1 and FIG. 2 such that the description thereof is omitted. However, in the color conversion panel 30, the substrate 310 shown in FIG. 1 may be arranged away from the display panel 10. That is, the substrate 310 of the color conversion panel 30 may be arranged farthest based on the display panel 10, and the other constituent elements of the color conversion panel 30 may be arranged on one surface of the substrate 310 toward the display panel 10.

Next, the display panel 10 may include a liquid crystal panel forming a vertical electric field, however embodiments of the present invention not limited thereto, and the display panel 10 may be a display panel such as a liquid crystal panel forming a horizontal electric field, a plasma display panel (PDP), an organic light emitting diode display (OLED), a surface conduction electron-emitter display (SED), a field emission display (FED), a vacuum fluorescent display (VFD), or an e-paper. Hereafter, the display panel 10 forming the vertical electric field will be described in more detail as one example.

Next, the light assembly 500 may include a light source arranged under the display panel 10 and generating the light, and a light guide receiving the light and guiding the received light in the direction of the display panel 10 and the color conversion panel 30. When the display panel 10 is the organic light emitting device, the light assembly 500 may be omitted.

According to some example embodiments of the present invention, the light assembly 500 may include at least one light emitting diode, and for example, may be a blue light emitting diode. The light source according to the present invention may be an edge-type light assembly arranged on at least one side of the light guide plate, or may be a direct-type where the light source of the light assembly 500 is arranged in a direct lower portion of the light guide plate, however embodiments of the present invention are not limited thereto.

Next, the display panel 10 according to an example embodiment of the present invention will be described in more detail with reference to FIG. 9 and FIG. 10.

The display panel 10 may include a liquid crystal panel 50 representing the image and polarizers 12 and 22 on respective surfaces of the liquid crystal panel 50. The first polarizer 12 and the second polarizer 22 for polarization of the light incident from the light assembly 500 are arranged at respective surfaces of the liquid crystal panel 50.

The polarizers 12 and 22 may be at least one of a coating polarizer and a wire grid polarizer. These polarizers 12 and 22 may be arranged at one surface of the display panel 100 and 200 by various methods such as a film method, a coating method, an adhering method, and the like. However, this description is one example and embodiments of the present invention not limited thereto.

The liquid crystal panel 50 includes a lower panel 100 including a thin film transistor to display the image, an upper panel 200 including a second insulation substrate 210 overlapping the lower panel 100, and a liquid crystal layer 3 interposed between the lower panel 100 and the upper panel 200.

A plurality of pixel electrodes are arranged on the first insulation substrate 110 included in the lower panel 100 in a matrix shape.

On the first insulation substrate 110, a gate line 121 extending in a row direction and including a gate electrode 124, a gate insulating layer 140 arranged on the gate line 121, a semiconductor layer 154 arranged on the gate insulating layer 140, a data line 171 arranged on the semiconductor layer 154, extending in a column direction, and including a source electrode 173, a drain electrode 175, a passivation layer 180 arranged on the data line 171 and the drain electrode 175, and a pixel electrode 191 electrically and physically connected to the drain electrode 175 through a contact hole 185 are arranged.

The semiconductor layer 154 arranged on the gate electrode 124 forms a channel layer in the region that is exposed by the source electrode 173 and the drain electrode 175, and the gate electrode 124, the semiconductor layer 154, the source electrode 173, and the drain electrode 175 form one thin film transistor.

Next, the upper panel 200 will be described in more detail.

The second insulation substrate 210 faces the first insulation substrate 110 to be separated therefrom. A light blocking member 220 may be arranged on one surface of the second insulation substrate 210 toward the first insulation substrate 110, and a planarization layer 250 may be arranged on one surface of the light blocking member 220 toward the first insulation substrate 110. A common electrode 270 may be arranged on one surface of the planarization layer 250 toward the first insulation substrate 110. According to an example embodiment, the planarization layer 250 may be omitted.

The common electrode 270 receiving a common voltage forms an electric field with the pixel electrode 191 and arranges (or rearranges) liquid crystal molecules 31 arranged in the liquid crystal layer 3.

As described above, the upper panel 200 is arranged away from the lower panel 100 such that the second insulation substrate 210 is located on the outer side of the liquid crystal panel 50. That is, the second insulation substrate 210 may be arranged to be farthest based on the lower panel 100.

The liquid crystal layer 3 includes a plurality of liquid crystal molecules 31, and the arrangement direction of the liquid crystal molecules 31 is controlled by the electric field between the pixel electrode 191 and the common electrode 270. According to the arrangement of the liquid crystal molecules, transmittance of light received from the light assembly 500 may be controlled to display an image.

An alignment layer (not illustrated) is disposed between the pixel electrode 191 and the liquid crystal layer 3, and the common electrode 270 and the liquid crystal layer 3.

The above-described display device provides the color reproducibility and the contrast ratio that are improved through the color conversion panel.

Figure 11:
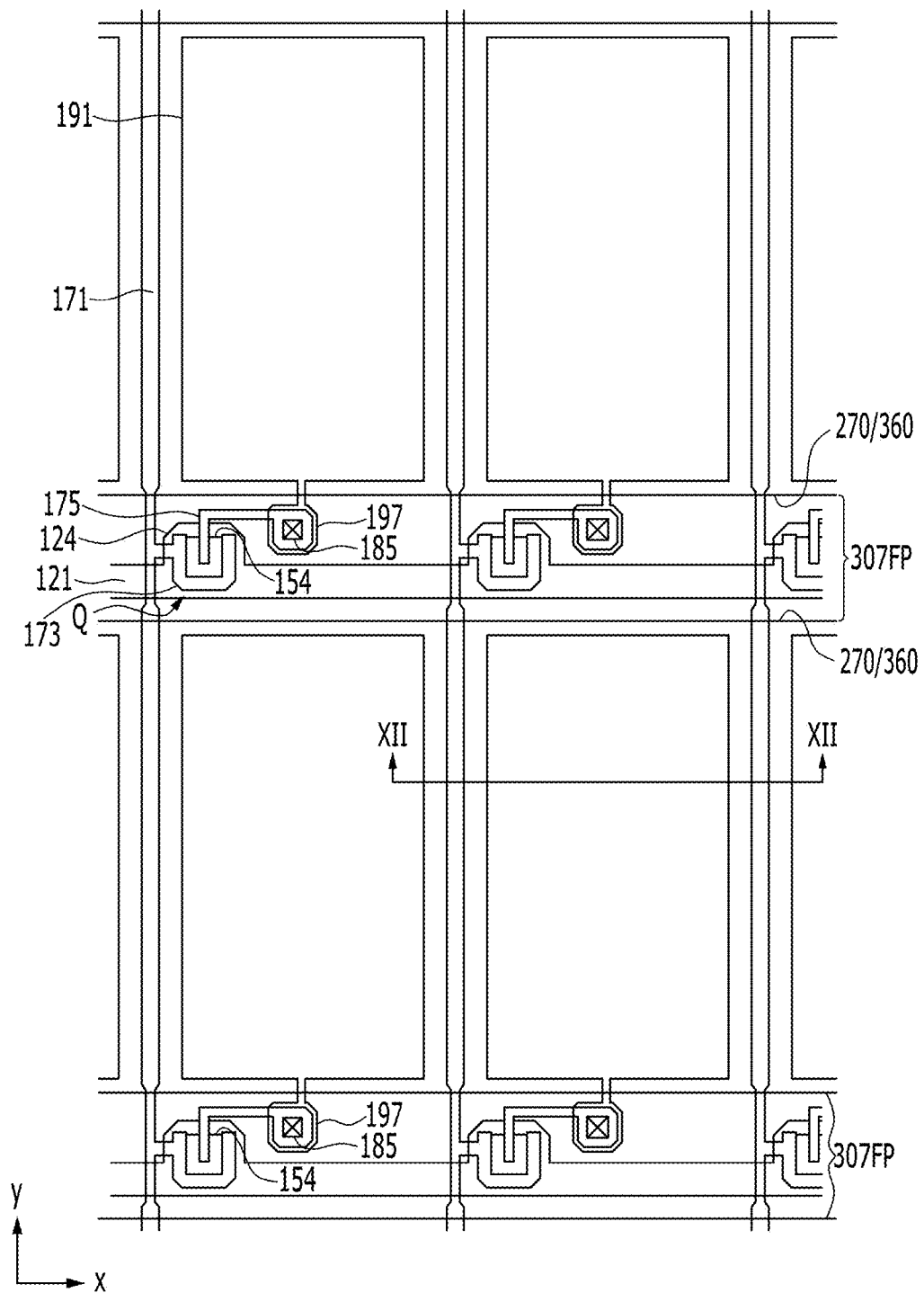
FIG. 11 is a top plan view of one pixel of a display device according to an example embodiment of the present invention.
Figure 12:
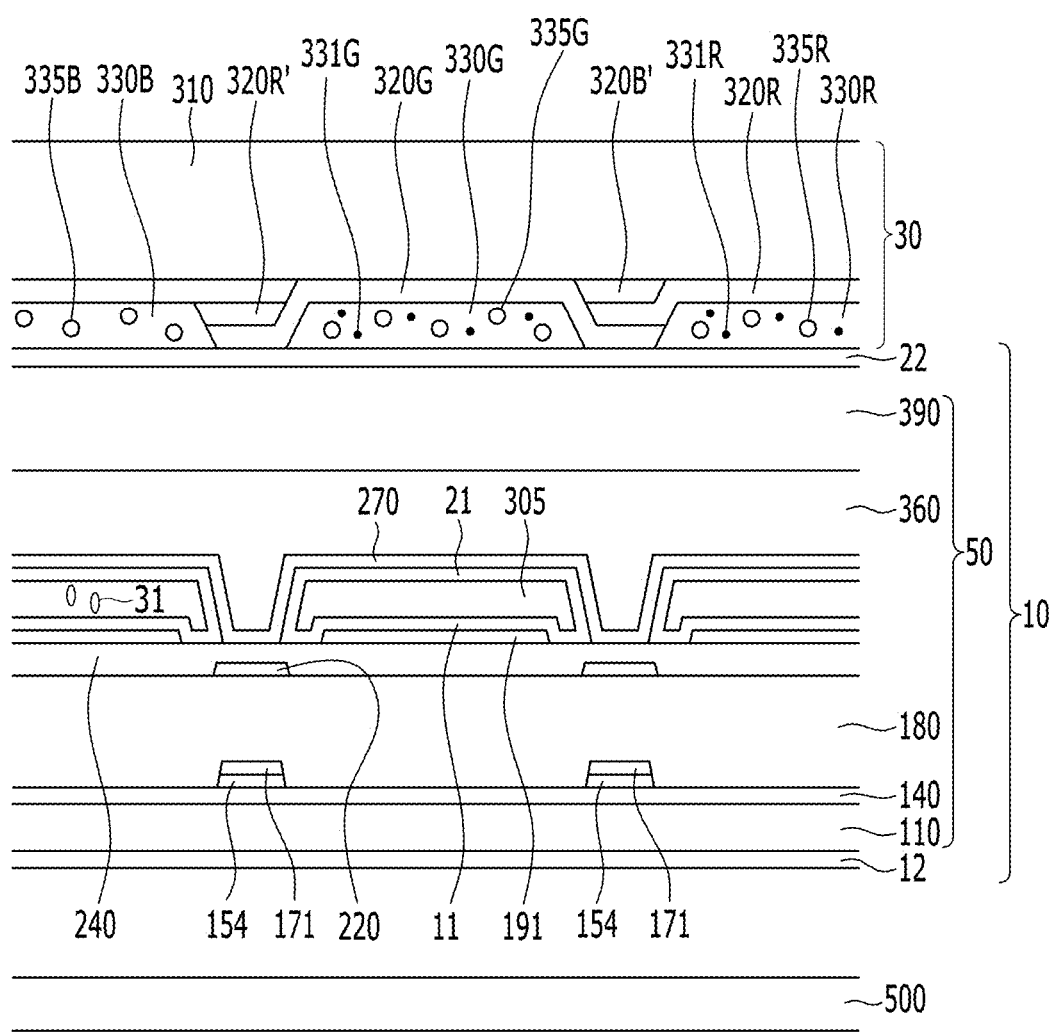
FIG. 12 is a cross-sectional view taken along the line XII-XII of FIG. 11.

Next, the display device according to an example embodiment of the present invention will be described with reference to FIG. 11 and FIG. 12. FIG. 11 is a top plan view of one pixel of a display device according to an example embodiment of the present invention, and FIG. 12 is a cross-sectional view taken along the line XII-XII of FIG. 11.

The display device according to an example embodiment of the present invention includes the color conversion panel 30, the display panel 10, and the light assembly 500. The display panel 10 may be arranged on the light assembly 500, and the color conversion panel 30 may be arranged on the display panel 10.

The color conversion panel 30 and the light assembly 500 included in the display device according to an example embodiment of the present invention are the same as (or similar to) the above-described example embodiment, such that some repetitive description thereof is omitted. However, in the color conversion panel 30, the substrate 310 may be arranged away from the display panel 10. That is, the substrate 310 of the color conversion panel 30 may be arranged to be farthest based on the display panel 10.

Next, the display panel 10 may include a liquid crystal panel 50 displaying an image and polarizers 12 and 22 arranged on respective surfaces of the liquid crystal panel 50. A first polarizer 12 and a second polarizer 22 for polarization of the light incident from the light assembly 500 are arranged at respective surfaces of the liquid crystal panel 50.

FIG. 11 shows a 2×2 pixel part as a center part of the plurality of pixels respectively corresponding to a plurality of microcavities 305, and these pixels may be repeated vertically and horizontally in the display device according to an embodiment of the present invention.

Referring to FIG. 11 to FIG. 12, the gate line 121 includes a gate electrode 124. A gate insulating layer 140 is disposed on the gate line 121. On the gate insulating layer 140, a semiconductor layer 154 is disposed under a data line 171 and a semiconductor layer 154 is disposed under source/drain electrodes 173 and 175 and in a channel part of a thin film transistor Q.

Data conductors 171, 173, and 175, including the source electrode 173, the data line 171 connected to the source electrode 173, and the drain electrode 175, are formed on the semiconductor layers 154 and the gate insulating layer 140.

The gate electrode 124, the source electrode 173, and the drain electrode 175 form the thin film transistor Q along the semiconductor layer 154, and the channel of the thin film transistor Q is formed in the semiconductor layer 154 between the source electrode 173 and the drain electrode 175.

A first passivation layer 180 may be disposed on the data conductors 171, 173, and 175 and the exposed part of the semiconductor layer 154. The first passivation layer 180 may include an inorganic insulator such as silicon nitride (SiNx) and silicon oxide (SiOx) or an organic insulator.

A light blocking member 220 and a second passivation layer 240 are disposed on the first passivation layer 180.

The light blocking member 220 is formed in a lattice structure having openings corresponding to an area displaying the image, and made of a material through which light does not pass.

The second passivation layer 240 may include an inorganic insulator such as silicon nitride (SiNx) and silicon oxide (SiOx) or an organic insulator.

The first and second passivation layers 180 and 240 and the light blocking member 220 have a contact hole 185 exposing the drain electrode 175.

The pixel electrode 191 is disposed on the second passivation layer 240. The pixel electrode 191 may be made of a transparent conductive material such as ITO or IZO.

The overall shape of the pixel electrode 191 is planar shape.

The pixel electrode 191 includes a protrusion 197 which is physically and electrically connected to the drain electrode 175 on the protrusion 197 through the contact hole 185, thereby receiving the data voltage from the drain electrode 175.

The thin film transistor Q and the pixel electrode 191 described above are only described as examples, and the structure of the thin film transistor and design of the pixel electrode are not limited to the structure described in the present embodiment, but may be modified to be applied based on the description according to an embodiment of the present invention.

A lower alignment layer 11 is disposed on the pixel electrode 191, and the lower alignment layer 11 may be a vertical alignment layer. The lower alignment layer 11 may include at least one of the materials generally used as a liquid crystal alignment layer, such as polyamic acid, polysiloxane, polyimide, or the like.

An upper alignment layer 21 is disposed to face the lower alignment layer 11, and the microcavities 305 are disposed between the lower alignment layer 11 and the upper alignment layer 21. Liquid crystal molecules 31 are injected in the microcavities 305 to form the liquid crystal layer 3. A plurality of microcavities 305 may be disposed along the column direction of the pixel electrode 191, i.e., the vertical direction. In the present embodiment, an alignment material forming the alignment layers 11 and 21 and the liquid crystal molecule 31 including the liquid crystal molecules may be injected to the microcavities 305 by using a capillary force. In the present embodiment, the lower alignment layer 11 and the upper alignment layer 21 are only divided depending on the position, as shown in FIG. 12, and may be connected to each other. The lower alignment layer 11 and the upper alignment layer 21 may be simultaneously formed.

The lower alignment layer 11 and the upper alignment layer 21 described above are only described as examples, and the lower and the upper alignment layer material are not limited to the structure described in the present embodiment, but may be modified to be applied based on the description according to an embodiment of the present invention.

The microcavities 305 are divided in the vertical direction by a plurality of liquid crystal inlets 307FP disposed at the portion overlapping the gate line 121 to form the plurality of microcavities 305, and the plurality of microcavities 305 may be disposed along the column direction of the pixel electrode 191, i.e., the vertical direction. Also, the microcavities 305 are divided by a partition in the X-axis direction to form a plurality of microcavities 305, and the plurality of microcavities 305 may be formed along the X-axis direction of the pixel electrode 191. The plurality of the microcavities 305 may correspond to one pixel area, or two or more, and the pixel area may correspond to a region displaying the image.

The common electrode 270 is disposed on the upper alignment layer 21. The common electrode 270 receives the common voltage and generates an electric field together with the pixel electrode 191, to which the data voltage is applied, to determine a direction in which the liquid crystal molecules 31 disposed at the microcavities 305 between the two electrodes are inclined The common electrode 270 forms the capacitor along with the pixel electrode 191 such that the applied voltage is maintained after the thin film transistor is turned-off. In the present embodiment, the common electrode 270 is disposed on the microcavities 305, however the common electrode 270 may be disposed under the microcavities 305 as another embodiment to realize the liquid crystal driving according to a coplanar electrode (CE) mode.

A roof layer 360 is disposed on the common electrode 270. The roof layer 360 serves as a support so that the microcavity 305, which is a space between the pixel electrode 191 and the common electrode 270, is formed. The roof layer 360 may include a photoresist, or other organic materials.

A capping layer 390 is disposed on the roof layer 360. The capping layer 390 includes an organic material or inorganic material. In the present embodiment, the capping layer 390 may be formed in the liquid crystal inlet 307FP as well as on roof layer 360. In this case, the capping layer 390 may cover the inlet 307FP of the microcavities 305 exposed by the liquid crystal inlet 307FP.

In the display device according to an example embodiment of the present invention, the contrast ratio and the color reproducibility are improved and the reflection degree is reduced, thereby providing the display device of relatively excellent display quality, and by using one sheet of the substrate, the manufacturing process and the structure may be simplified.

Figure 13:
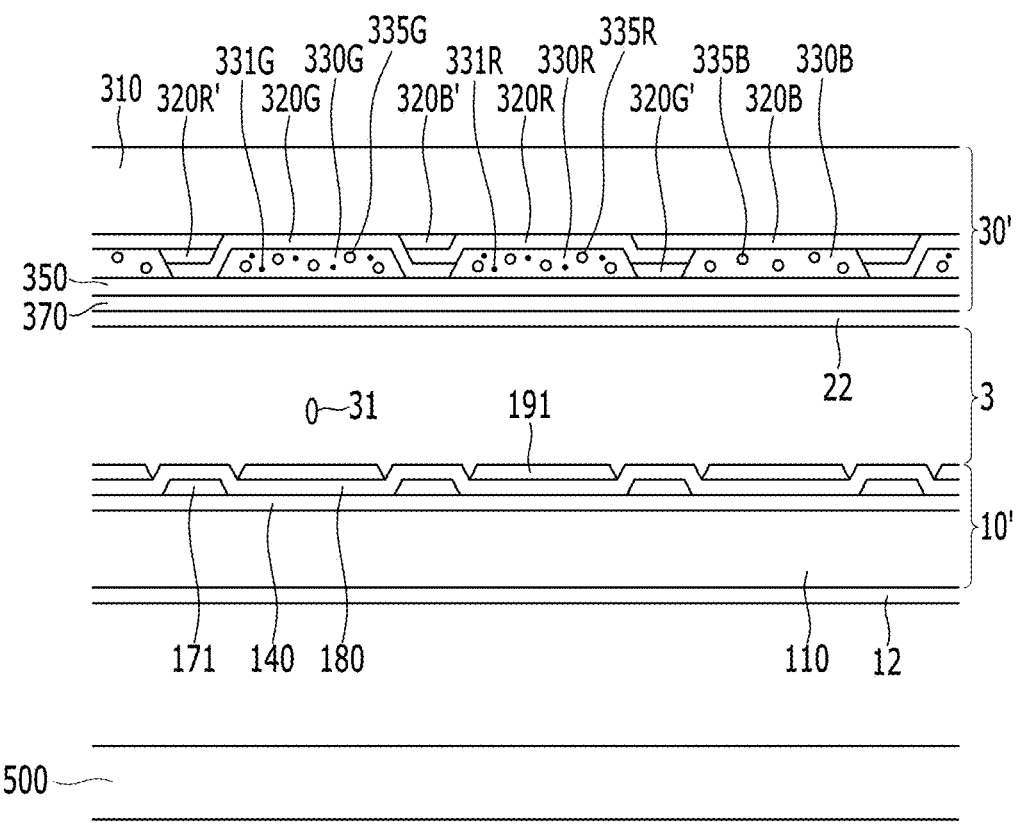
FIG. 13 is a cross-sectional view of a display device according to an example embodiment of the present invention.

Next, the display device according to an example embodiment of the present invention will be described with reference to FIG. 13. FIG. 13 is a cross-sectional view of a display device according to an example embodiment of the present invention.

The display device according to an example embodiment of the present invention shown in FIG. 13 includes a display panel 10', a color conversion panel 30', and a light assembly 500. The light assembly 500 is the same as (or substantially similar to) the above-described constituent element such that some repetitive description thereof is omitted.

The display device according to an example embodiment of the present invention includes the display panel 10', the color conversion panel 30' overlapping the display panel 10' to be spaced apart therefrom, and a liquid crystal layer 3 arranged between the display panel 10' and the color conversion panel 30' and including the liquid crystal molecules.

The display device according to the present specification may further include the first polarizer 12 and the second polarizer 22 arranged on one surface of the display panel 10' and the color conversion panel 30'.

The display panel 10' according to the present example embodiment is the same as (or substantially similar to) the lower panel 100 of FIG. 10 and the color conversion panel 30' is similar to the color conversion panel 30 of FIG. 1 such that FIG. 1 and FIG. 10 may be referred to as well as FIG. 13.

Firstly, the plurality of pixel electrodes are formed in the matrix shape on the first insulation substrate 110 included in the display panel 10'.

On the first insulation substrate 110, a gate line 121 extending in a row direction and including a gate electrode 124, a gate insulating layer 140 arranged on the gate line 121, a semiconductor layer 154 arranged on the gate insulating layer 140, a data line 171 arranged on the semiconductor layer 154, extending in a column direction, and including a source electrode 173, a drain electrode 175, a passivation layer 180 arranged on the data line 171 and the drain electrode 175, and a pixel electrode 191 electrically and physically connected to the drain electrode 175 through a contact hole 185 are arranged.

The semiconductor layer 154 arranged on the gate electrode 124 forms a channel layer in the region that is exposed by the source electrode 173 and the drain electrode 175, and the gate electrode 124, the semiconductor layer 154, the source electrode 173, and the drain electrode 175 form one thin film transistor.

Next, in the color conversion panel 30', a plurality of color filters 320R, 320G, and 320B are arranged on one surface of the substrate 310 toward the first insulation substrate 110. The color filters 320R, 320G, and 320B may include the dye that is the photosensitive resin material and respectively representing the colors. The color filters 320R, 320G, and 320B according to an example embodiment of the present invention include the red color filters 320R, the green color filters 320G, and the blue color filters 320B. The red color filters 320R and 320R', the green color filters 320G and 320G', and the blue color filters 320B and 320B' may be formed to be arranged in the light emitting region or the light blocking region.

In detail, as shown in FIG. 13, the red color filters 320R and 320R' may be arranged to be disposed between the substrate 310 and the liquid crystal layer 3 in the light emitting region LA or may be arranged to overlap the other color filters 320G' and 320B' in the light blocking region SA. The green color filter 320G is also arranged to be disposed between the substrate 310 and the liquid crystal layer 3 in the light emitting region LA, and is arranged to overlap the other color filters 320R' and 320B' in the light blocking region SA. The blue color filter 320B is arranged to be disposed between the substrate 310 and the liquid crystal layer 3 in the light emitting region LA, and is arranged to overlap the other color filters 320R' and 320G' in the light blocking region SA.

When the plurality of color filters overlap, the light generated in the display panel or the light assembly may be blocked without the separate light blocking member.

In summary, at least two color filters 320R', 320G', and 320B' are arranged to be overlapped in the light blocking region SA, and one of the color filters 320R, 320G, and 320B for representing the predetermined color is arranged in the light emitting region LA.

The plurality of color conversion layers 330R and 330G and polymer layers 330B are arranged on the plurality of color filters 320R, 320G, and 320B arranged in the light emitting region LA. The plurality of color conversion layers 330R and 330G and polymer layers 330B may emit the different colors from each other, and may be the red color conversion layer 330R, the green color conversion layer 330G, and the polymer layer 330B as one example.

The plurality of overlapped color filters 320R', 320G', and 320B' arranged in the light blocking region are arranged between the adjacent color conversion layers 330R and 330G and polymer layers 330B. That is, the light blocking region SA is arranged between the adjacent color conversion layers 330R and 330G and polymer layers 330B, and may define the region where the red color conversion layer 330R, the green color conversion layer 330G, and the polymer layer 330B are arranged.

The red color conversion layer 330R includes at least one of the phosphor and the quantum dot 331R converting the blue light into the red light. The green color conversion layer 330G includes at least one of the phosphor and the quantum dot 331G converting the blue light into the green light, and the present specification describes an example embodiment including the quantum dot 331G as one example.

The red color conversion layer 330R and the green color conversion layer 330G include the quantum dots 331R and 331G instead of the phosphor for converting the color, or may further include the quantum dots 331R and 331G in addition to the phosphor. In this case, the quantum dot may be selected from the Group II-VI compound, the Group IV-VI compound, the Group IV element, the Group IV compound, and combinations thereof.

The polymer layer 330B may be the resin material passing the blue light supplied from the light assembly. That is, the polymer layer 330B corresponding to the region emitting the blue light emits the incident blue light as it is without the separate phosphor or quantum dot.

At least one among the plurality of color conversion layers 330R and 330G and polymer layers 330B according to an example embodiment may further include the scatterers 335R, 335G, and 335B. For example, the plurality of color conversion layers 330R and 330G and polymer layers 330B may respectively include the scatterers 335R, 335G, and 335B, however they are not limited thereto, and the polymer layer 330B may include the scatterer 335B and the red color conversion layer 330R and the green color conversion layer 330G may not include the scatterers 335R and 335G.

A planarization layer 350 providing the flat surface may be arranged on the color conversion layers 330R and 330G and the polymer layers 330B arranged in the light emitting region LA and one surface of the light blocking region SA toward the first insulation substrate 110, and the common electrode 270 is arranged on the planarization layer 350. According to an example embodiment of the present invention, the planarization layer 350 may be omitted.

The common electrode 370 applied with the common voltage forms the electric field with the pixel electrode 191, and arranges the liquid crystal molecules 31 arranged in the liquid crystal layer 3.

The liquid crystal layer 3 includes a plurality of liquid crystal molecules 31, and the arrangement direction of the liquid crystal molecules 31 is controlled by the electric field between the pixel electrode 191 and the common electrode 270. According to the arrangement of the liquid crystal molecules, transmittance of light received from a light assembly 500 may be controlled to display an image.

The display device according to the above-described example embodiment of the present invention includes the upper panel 200 shown in FIG. 10, and the color conversion panel 30' replaces the function and the position of the upper panel. This display device may be provided with the further thinner thickness and the cost and the weight may be reduced.

Figure 14:
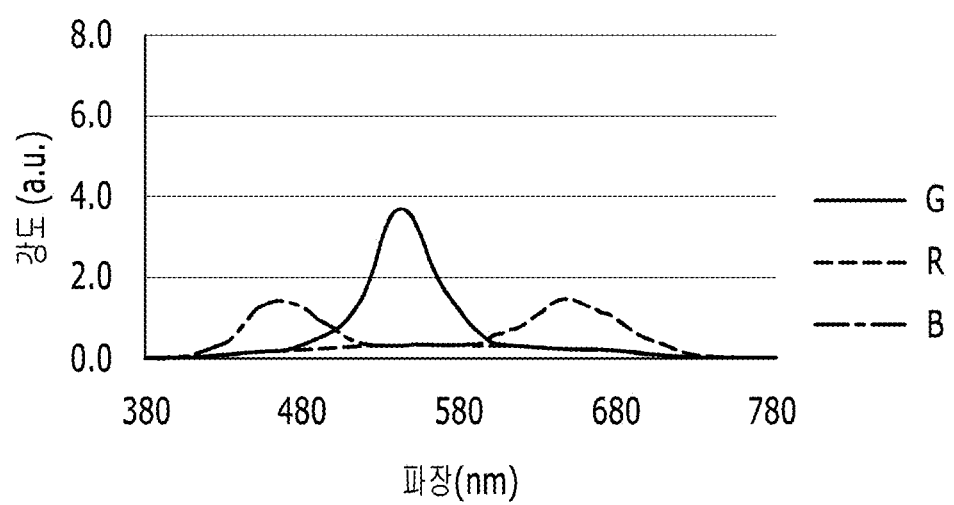
FIG. 14 and FIG. 15 are graphs representing a reflection degree of a color conversion panel according to an example embodiment of the present invention and a comparative example.
Figure 15:
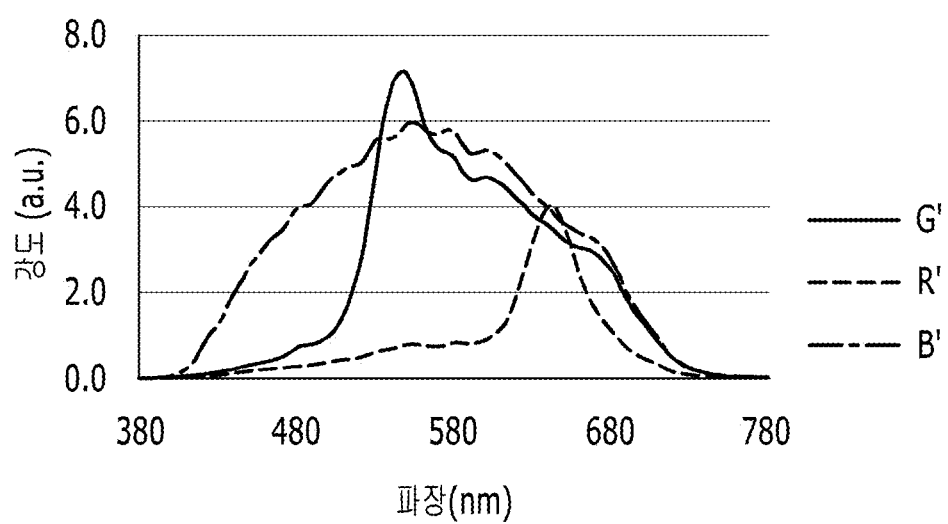
Figure 16:
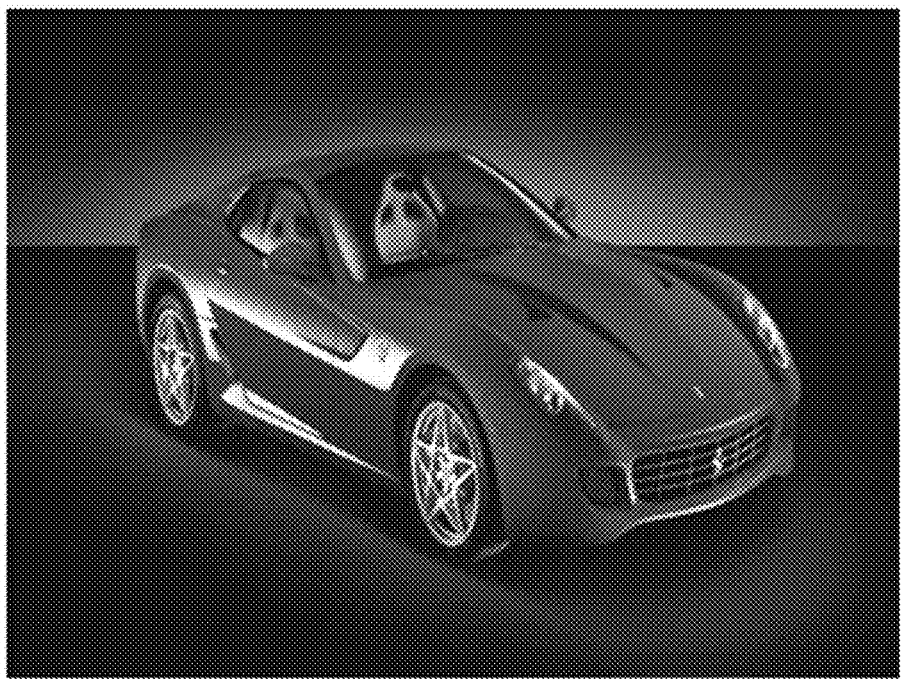
FIG. 16 and FIG. 17 are images of a display device according to an example embodiment of the present invention and a comparative example.
Figure 17:
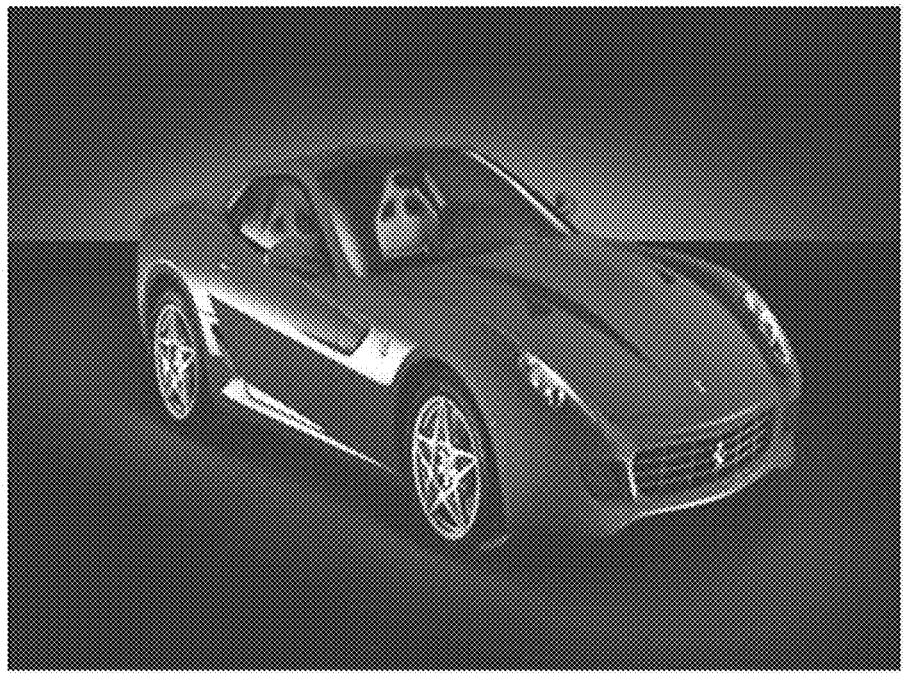

Next, a reflection degree and a contrast ratio improvement degree of the display device according to an example embodiment of the present invention and a comparative example will be described with reference to FIG. 14 to FIG. 17. FIG. 14 and FIG. 15 are graphs representing a reflection degree of a color conversion panel according to an example embodiment and a comparative example, and FIG. 16 and FIG. 17 are images of a display device according to an example embodiment and a comparative example.

Firstly, FIG. 14 is a reflection spectrum graph for the example embodiment, and the example embodiment is the color conversion panel in which the color filter is arranged on the substrate and the plurality of color filters having the different colors overlap each other in the light blocking region. As a result of examining the reflection spectrum for the color conversion panel according to an example embodiment, as shown in FIG. 14, it may be confirmed that the reflection degree is very small throughout the entire wavelength region.

In contrast, FIG. 15 is the reflection spectrum graph according to the comparative example, and the comparative example is the color conversion panel including the plurality of color conversion layers and polymer layers on the substrate and the light blocking member defining the plurality of color conversion layers and polymer layers. As shown in FIG. 15, it may be confirmed that the reflection is generated throughout a significant portion of the wavelength range in each color conversion layer and polymer layer.

In detail, if is assumed that the reflectance of the color conversion panel according to the comparative example is 100%, the reflectance of the color conversion panel according to the example embodiment is about 33%. Compared to the example embodiment, the reflectance may be reduced by about 70%.

Accordingly, like the example embodiment, when the color filter is arranged on the substrate, compared with the comparative example in which the color conversion layer and polymer layer are simply only arranged, it is confirmed that the reflection is reduced, thereby providing better display quality.

Next, referring to FIG. 16 and FIG. 17, the display device (FIG. 16) according to the example embodiment has a relatively excellent contrast ratio and color reproducibility compared with the display device (FIG. 17) according to the comparative example.

This is because the color filter including the dye is arranged on the substrate according to the example embodiment to absorb the external light incident to the color conversion panel, thereby reducing the reflection phenomenon due to the reflection light. According to this reduction of the reflectance, the contrast ratio of the color conversion panel and the display device is increased and the display quality is improved.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims, and their equivalents.

| Description of Some of the Symbols | |
| --- | --- |
| 10: display panel | 12, 22: polarizer |
| 30: color conversion panel | 310: substrate |

What is claimed is:

1. A color conversion panel comprising:
a substrate;
a plurality of light emitting regions on the substrate; and
a light blocking region between adjacent light emitting regions among the plurality of light emitting regions,
wherein the light emitting regions respectively comprise:
a color filter disposed on the substrate; and
a color conversion layer comprising at least one of a phosphor or a quantum dot and a polymer layer overlapping with at least one of the color filter and the substrate, and
the light blocking region comprises a partition comprising at least two overlapping color filters of different colors from each other.

2. The color conversion panel of claim 1, wherein
a color filter in the light emitting region and a color filter in the light blocking region are connected to each other.

3. The color conversion panel of claim 2, wherein
the color filter in the light blocking region and the color filter in the light emitting region that are connected to each other cover one side surface of the color filters having the different colors.

4. The color conversion panel of claim 1, wherein
the color filter in the light emitting region and the color filter in the light blocking region have a step.

5. The color conversion panel of claim 1, wherein
the color conversion layer comprises a red color conversion layer and a green color conversion layer and
at least one among the red color conversion layer, the green color conversion layer, or the polymer layer comprises a scatterer.

6. The color conversion panel of claim 5, wherein
the color filter comprises a red color filter, a green color filter, and a blue color filter, and in the light emitting region,
the red color filter and the red color conversion layer overlap, the green color filter and the green color conversion layer overlap, and the blue color filter and the polymer layer overlap.

7. The color conversion panel of claim 6, wherein
the red color filter, the green color filter, and the blue color filter overlap in the light blocking region, and
the blue color filter in the light blocking region is closer to the substrate than the red color filter and the green color filter.

8. The color conversion panel of claim 5, wherein
the color filter comprises a red color filter and a green color filter, and
in the light emitting region, the red color filter and the red color conversion layer overlap, and the green color filter and the green color conversion layer overlap, and
the red color filter, the green color filter, and the polymer layer overlap in the light blocking region.

9. The color conversion panel of claim 1, wherein
the polymer layer comprises at least one of a dye or a pigment.

10. A display device comprising:
a display panel; and
a color conversion panel on the display panel,
wherein the color conversion panel comprises:
a substrate;
a plurality of light emitting regions between the substrate and the display panel; and
a light blocking region between adjacent light emitting regions among the plurality of light emitting regions,
the light emitting regions respectively comprising:
  a color filter between the substrate and the display panel; and
  a color conversion layer comprising at least one of a phosphor or a quantum dot and a polymer layer between the substrate and the display panel and
the light blocking region comprises a partition made by overlapping at least two color filters having different colors from each other.

11. The display device of claim 10, wherein
the color filter in the light emitting region and the color filter disposed in the light blocking region are connected to each other.

12. The display device of claim 11, wherein
the color filter in the light emitting region and the color filter in the light blocking region that are connected to each other cover one side surface of the color filters having the different colors.

13. The display device of claim 10, wherein
the color filter in the light emitting region and the color filter in the light blocking region have a step.

14. The display device of claim 10, wherein
the color conversion layer comprises a red color conversion layer and a green color conversion layer, and
at least one of the red color conversion layer, the green color conversion layer, or the polymer layer comprises a scatterer.

15. The display device of claim 14, wherein
the color filter comprises a red color filter, a green color filter, and a blue color filter, and
in the light emitting region,
the red color filter and the red color conversion layer overlap, the green color filter and the green color conversion layer overlap, and the blue color filter and the polymer layer overlap.

16. The display device of claim 15, wherein
the red color filter, the green color filter, and the blue color filter overlap in the light blocking region, and
the blue color filter in the light blocking region is closer to the substrate than the red color filter and the green color filter.

17. The display device of claim 14, wherein
the color filter comprises a red color filter and a green color filter, and
in the light emitting region, the red color filter and the red color conversion layer overlap, and the green color filter and the green color conversion layer overlap, and
the red color filter, the green color filter, and the polymer layer overlap in the light blocking region.

18. The display device of claim 10, wherein
the polymer layer comprises at least one of a dye or a pigment.

19. The display device of claim 10, wherein
the display panel comprises:
a first insulation substrate;
a thin film transistor on the first insulation substrate;
a pixel electrode connected to the thin film transistor;
a common electrode configured to form an electric field with the pixel electrode;
a second insulation substrate overlapping the first insulation substrate to be separated therefrom; and
a liquid crystal layer between the first insulation substrate and the second insulation substrate.

20. The display device of claim 10, wherein
the display panel comprises:
an insulation substrate;
a thin film transistor on the insulation substrate;
a pixel electrode connected to the thin film transistor;
a roof layer overlapping the pixel electrode; and
a liquid crystal layer in a plurality of microcavities between the pixel electrode and the roof layer.

* * * * *